(12) United States Patent
Czarnetzky

(10) Patent No.: US 8,577,689 B1
(45) Date of Patent: Nov. 5, 2013

(54) JEWELRY REGISTRATION, VERIFICATION AND RECOVERY SYSTEM AND METHOD

(75) Inventor: Edward M. Czarnetzky, Vienna, VA (US)

(73) Assignee: Edward M. Czarnetzky, Vienna (VA)

( * ) Notice: Subject to any disclaimer, the term of this patent is extended or adjusted under 35 U.S.C. 154(b) by 779 days.

(21) Appl. No.: 12/566,271

(22) Filed: Sep. 24, 2009

Related U.S. Application Data

(60) Provisional application No. 61/099,753, filed on Sep. 24, 2008.

(51) Int. Cl.
*G06Q 10/00* (2012.01)

(52) U.S. Cl.
USPC .......................................................... 705/1.1

(58) Field of Classification Search
None
See application file for complete search history.

(56) References Cited

U.S. PATENT DOCUMENTS

| | | | | |
|---|---|---|---|---|
| 5,983,238 | A * | 11/1999 | Becker et al. ......................... | 1/1 |
| 6,467,307 | B1 * | 10/2002 | Watson ................................ | 63/3 |
| 2004/0002998 | A1 * | 1/2004 | Takahashi et al. ......... | 707/104.1 |
| 2006/0212357 | A1 * | 9/2006 | White et al. .................... | 705/18 |

OTHER PUBLICATIONS

Vinguard (http://www.vinguard.org/vin.htm retrieved from Internet wayback machine dated Jun. 21, 2007).*

* cited by examiner

*Primary Examiner* — Jonathan Ouellette
*Assistant Examiner* — Maame Ofori-Awuah
(74) *Attorney, Agent, or Firm* — Altera Law Group, LLC

(57) ABSTRACT

A jewelry registration, verification and recovery system is disclosed, which includes a coding system that summarizes the physical characteristics of any piece of jewelry. The code includes various positions, with each position corresponding to a physical characteristic, such as the type of jewelry, the weight, the color of the metal, and so forth. Each position (or category) has a predetermined number of alphanumeric digits (or values) in the code, such as one, two, and so forth. A database is established to house the codes and locations of as many pieces of jewelry as possible, with nationwide, or even worldwide entries. In the event of a loss or theft of a particular piece of jewelry, the code (and optionally the location) of the lost piece is supplied to the database, which returns each database entry having the same code as the lost piece, along with its location and an indication if it has been reported stolen or missing, optionally within a particular time window. In this manner, a pawn shop may easily and quickly verify that a particular jewelry item brought in for sale is not stolen, prior to purchasing it.

22 Claims, 4 Drawing Sheets

TRADEMARKS: Ø, IGS
FINENESS MARKS: 14k, 18k, PLAT       Figure 3
DATE: 2-12-95
INITIALS: *J.D.K*
NAME: Cathy
| | D | E |
|---|---|---|
| 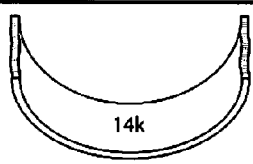 | 2 | 0 |
|  | 2 | 1 |
| 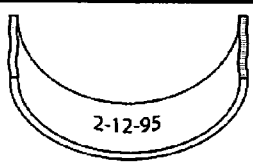 | 0 | 2 |
| 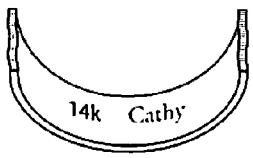 | 2 | 3 |
|  | 2 | 4 |
|  | 2 | 5 |

| | D | E |
|---|---|---|
|  | | |
| 14k ∅ J.D.K. | 2 | 6 |
| 14k Cathy ∅ | 2 | 7 |
| 14k J.D.K. 2-12-95 | 2 | 8 |
| 18k Plat | 3 | a |
| 18k IGS Plat | 3 | b |
| 14k J.D.K. 2-12-95 | 2 | 8 |

JEWELRY REGISTRATION, VERIFICATION AND RECOVERY SYSTEM AND METHOD

CROSS-REFERENCE TO RELATED APPLICATION

This application claims priority of U.S. provisional patent application Ser. No. 61/099,753 filed 24 Sep. 2008 entitled: Jewelry Registration, Verification And Recovery System And Method.

BACKGROUND OF THE INVENTION

1. Field of the Invention

The present invention is directed to a jewelry registration, verification and recovery system.

2. Description of the Related Art

Throughout modern times it has been standard practice to describe jewelry in intricate detail for purposes of sales promotion, auction descriptions, museum/display exhibitions and appraisals for insurance replacement. While these narrative descriptions are important for aesthetic appreciation and commerce, they are not well suited to modern data processing methods for search and retrieval leading to recovery of lost or stolen items. The plethora of adjective choices, trade jargon, writers' opinions and subjective quality evaluations render these descriptive writings of little value in the rapid recovery of lost or stolen items using modern data management methods.

Written jewelry descriptions, intended for reproducing jewelry if lost or stolen, may not make good references for searching for lost or stolen jewelry. Such narrative descriptions may not easily lend themselves to data management, search and retrieval methods without lengthy data input and consideration of technical/trade terminology. While often the victim of a theft has such a written a descriptive statement in the form of an appraisal, fitting it into an efficient method of data processing may be unwieldy. Furthermore, the subjective nature of jewelry quality analysis may frequently produce an "optimistic" evaluation by a seller/appraiser and a more "pessimistic" evaluation by a buyer (pawn shop). This may result in the same item having two different descriptions.

In addition, narratives may not lend themselves to efficient data processing for reasons of writing skills and word selection by the operators. For example, an imitation green gemstone could be described as a synthetic, lab-created, lab-grown, paste, a Gilson, a Chatham or be misidentified as natural.

Accordingly, there exists a need for a registration, verification and recovery system that allows for accurate, simplified search and retrieval.

BRIEF SUMMARY

A first embodiment is a method of registering a piece of jewelry, comprising: providing a plurality of physical characteristics of the piece of jewelry, the plurality including at least a description, a weight, a metal color, various maker's marks and stone color(s); assigning a code to the piece of jewelry, the code having a plurality of positions with a one-to-one correspondence with the plurality of physical characteristics; and submitting the code and image to a central database. Alternatively there is disclosed a method of registering a piece of jewelry, having providing a plurality of physical characteristics of the piece of jewelry, the plurality including at least an identity of type, a weight, a metal, markings, numbers and colors of contained gemstones; each characteristic being assigned a particular one digit code corresponding to a digit in a concatenated multi-digit code comprising a plurality of characteristics and their parameters for each digit of the code; assigning a code to the piece of jewelry, the code having a plurality of digital positions with a one-to-one correspondence with the plurality of physical characteristics; affixing the code to the jewelry; and submitting the code to a central database with corresponding owner information.

A second embodiment is a method of searching for a piece of jewelry, comprising: prompting a user for a search code, the search code representing a plurality of physical characteristics of the piece of jewelry; receiving the search code at a central database, the central database including a plurality of entries corresponding to previously reported pieces of jewelry, each entry comprising: a database code representing a plurality of physical characteristics; a database location; and a database status indicating having been reported stolen or missing; and transmitting to the user a subset of database entries, each entry in the subset having a database code identical to the search code.

A third embodiment is a system for tracking pieces of jewelry for respective users, comprising a server, the server being configured for: receiving an entry corresponding to a piece of jewelry, each entry comprising: a location; a status indicating whether the piece of jewelry has been reported stolen or missing; and a code, the code including a plurality of categories and at least one discrete value for each category, each category corresponding to a physical characteristic of the piece of jewelry; storing the received entry with a digital image in a central database; and retrieving the entry in response to a query, the query having the same code as the entry.

A fourth embodiment is search for previously un-coded items that are entered in search as partial codes using asterisk(s) "*" (wildcards) in code positions when the value category is not known.

A fifth embodiment is the ability of the inventions software to "remember" queries to the database for item verification so that searches for items checked BEFORE they were reported missing can be recovered when they are reported as missing.

A sixth embodiment is the automatic notification to the coder that a code being composed is too generic to provide a sufficiently unique code and should be engraved with date, initials, etc. in order to make its code more specific.

This summary is intended only as a guide to readers of the full application and not to be used as limitation of the invention. The scope of invention is defined only by the claims.

DETAILED DESCRIPTION OF THE INVENTION

Figure 1:
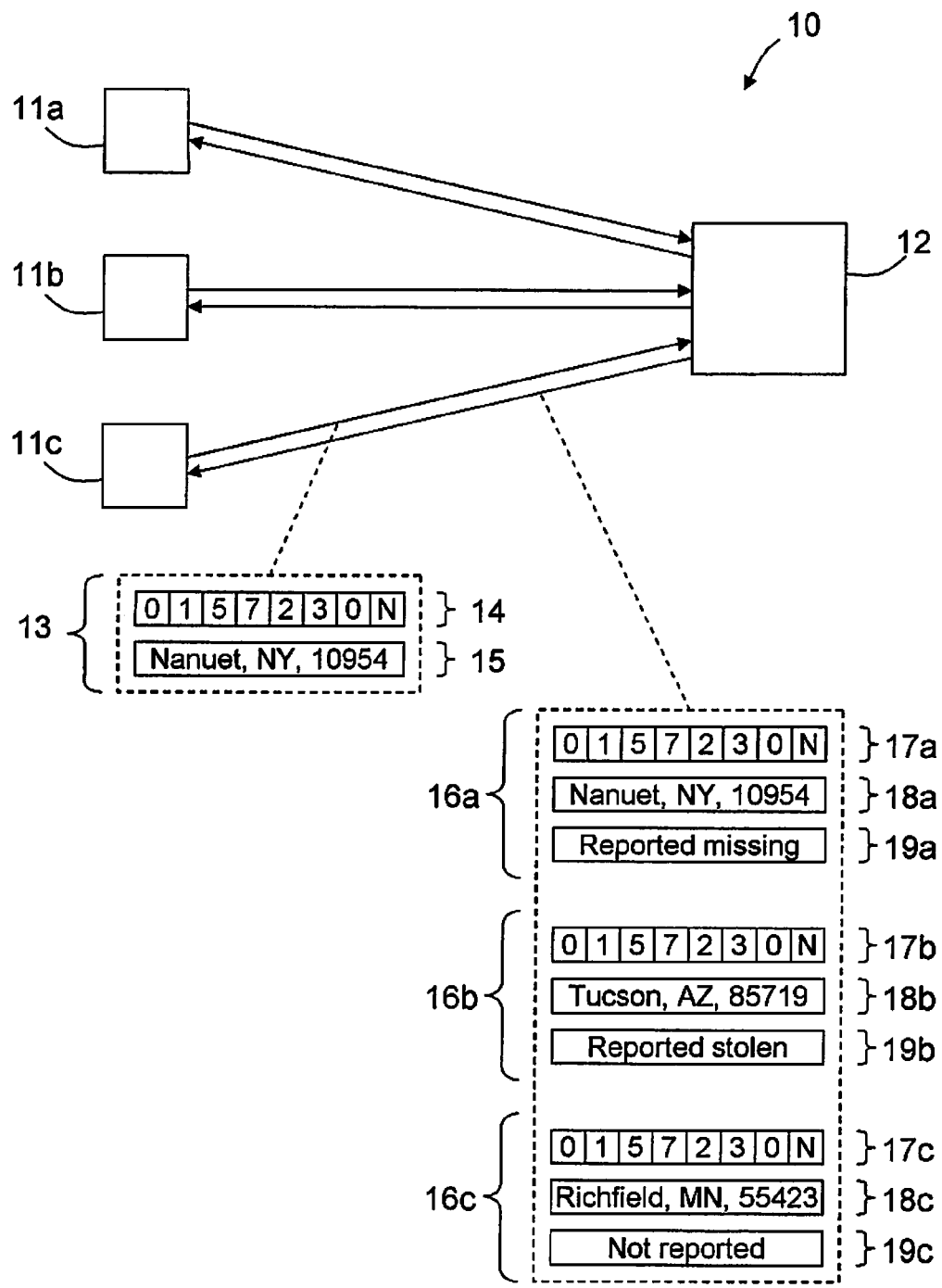
FIG. 1 is a schematic drawing of a jewelry registration, verification and recovery system is disclosed.

A jewelry registration, verification and recovery system is disclosed, which overcomes the shortcomings detailed above. The registration system includes a coding system that summarizes the physical characteristics of any piece of jewelry.

While the term "jewelry" is used frequently in this text, it should be understood to mean "valuables" which would include items not normally considered jewelry but which are easily stolen or lost but do not normally include the owner's return information or which has some other indicia which is easily removed or obliterated, such as a serial number on a watch. The coding system described herein is likewise adaptable to a broad range of articles which could be stolen. For example many items of art and design which are valuable or of museum grade could be categorized as appropriate, using different characteristics than those which are applicable to jewelry. This application is intended to encompass such items and categories as well. The code includes various positions, with each position corresponding to a physical characteristic, such as the type of jewelry, the weight, the color of the metal, and so forth. Each position (or category) has a predetermined number of alphanumeric digits (or values) in the code, such as one, two, and so forth. A database is established to house the codes and locations of as many pieces of jewelry as possible, with nationwide, or even worldwide entries. In the event of a loss or theft of a particular piece of jewelry, the code (and optionally the location) of the lost piece is supplied to the database, which returns each database entry having the same code as the lost piece, along with its location and an indication if it has been reported stolen or missing, optionally within a particular time window. In this manner, a pawn shop may easily and quickly verify that a particular jewelry item brought in for sale is not stolen, prior to purchasing it. The code can become a vital adjunct to the appraisal document as a shorthand search and organizational device.

There are many advantages to such a registration and verification system, which are detailed below.

First, the coding system is derived from simple physical properties of jewelry. Relatively unskilled operators are able to construct the codes with minimal training. Quality parameters that are often subjective and subject to "opinion" are avoided to maintain a high level of reproducibility of code assignment between different operators. For instance, the imitation green gemstone mentioned above may be encoded using its physical property of color, as simply "green" (or the alphanumeric value corresponding to "green").

Second, coded jewelry items may be easily be tracked in the event of theft. For instance, items may be "hot listed" in the case of their loss or theft and "watch lists" monitoring buying activities of secondary market purchasers (pawn shops) created. "Hits" represent buys of either the target item or of items very similar in description, which may allow investigators to efficiently monitor buying locations for stolen items.

Third, codes of lost or stolen items can be effectively "on the air" moments after the loss Codes may be maintained by the jewelry owner and/or maintained in a national database. Victims may hot list their items in the Central data base even before police take a report. In one embodiment of the invention, the time differential between registering an item, and it is recovery is relevant. For example, if an item is recovered before it is registered, the recovered item can be tagged in the data base and "unregistered" or of special concern. If the owner discovers later that it was stolen/lost and registers it, the search engine will look back into the data base for items recovered before registration, but for a predetermined period of time, the search engine will allow greater latitude of mismatch for registration/recovery in closer time proximity. Greater latitude would be a looser match criteria (explained below). Looser match criteria would ordinarily be a problem because too many hits would be found and the searcher would be effectively flooded with "noise", but the time proximity factor compensates for the noise by limiting the time range of match. This works whether the piece was pre-registered before lose or post-registered. The key is time gap between recovery and reported loss. The shorter it is, the looser the search may be. Looser criteria may be defined as, allowing the search engine to search for deviations in each digit of the code by a predetermined span such as + or −2 digits or allowing the search engine to deviate in a predetermined number of digits in the code, such as code digits 3, 4, and 5 may deviate. Alternatively, the combination of the two can be used, i.e. deviation in which digits of the code need not be exact and by how much they may deviate. The search engine may dynamically adjust this to insure that the searcher does not receive more than a predetermined number of hits and dynamically adjust the looseness of the search to insure this outcome.

Fourth, the registration system may give consumers a reasonable chance to recover treasured heirlooms while paying lower insurance premiums. News that consumers have a reasonable chance of recovering their "coded" items may be a great theft deterrent, may decrease their exposure to burglary and robbery attempts, and may help deprive the criminal element easy access to liquidation resources.

Fifth, pawn shops can offer their buying customers assurance that they have made every effort to avoid purchasing lost or stolen items. The registration system may place shop visitors intent on selling "hot" merchandise on alert that even minutes after a loss or theft, they run a substantial risk of discovery. Pawn shops do not want to deal with thieves or purchase stolen goods. Removal of a cash resource for the loot of criminals may dissuade them from property theft.

Sixth, insurance companies may recover more lost and stolen items, enabling them to reduce their costs of operating and increase benefits to customers. Adopting a jewelry registration system for clients may demonstrate the desire for insurance companies to protect their clients to whatever extent modern technology allows. Insurance clients may be provided with a memory card containing their jewelry codes and contact information. Victims of theft usually ask what is being done to find their stolen items. Indeed, sometimes victims become their own investigators and canvas pawn shops and buying locations looking for their lost treasures. The registration system receives their codes online almost immediately so that appropriate watch monitors can be established. This, in turn, may win the confidence of the insurance customer.

Seventh, the registration system may be a new crime-fighting tool for law enforcement. In addition to the obvious local law enforcement benefits, a jewelry registration system may allow for wide area (national) monitoring of buying sites that could be used by fleeing felons. Codes of stolen jewelry may be easily monitored to "track" a fleeing felon in similar fashion to credit card use. The reward incentive to pawn shops may make them crime fighting partners of considerable value to law enforcement. The jewelry codes may also easily adapt to NCIC information processing to integrate federal law enforcement.

Eighth, a recent Internet search for "recovering lost stolen property" returned nearly 2 million results. Many of these were for missing assets, stock certificates, bank accounts, etc. There is a large industry concerning finding missing assets. Very little has been done with jewelry owing to the previously mentioned problems solved by the present invention. Many stolen jewelry items are eventually found by law enforcement and auctioned at "public" auctions. Presently it would be impossible for a theft victim to seek descriptions of jewelry being sold by municipalities all over the country. If, however, the agency contemplating the auction coded the items and uploaded the codes as links with a photo or description people seeking to recover their property could "watch" for the codes of their missing treasures. This method could reunite a high percentage of victims with their lost jewelry.

The above eight advantages are merely exemplary, and should not be construed as limiting in any way. Other advantages are possible as well.

FIG. 1 is a schematic diagram of an exemplary jewelry registration and tracking system 10.

A number of users 11a, 11b, 11c may connect with database 12. Connections may be continuous, such as a pawn shop owner that leaves the connection on in the background, may be intermittent, such as a user that logs in to update a code, or may be a combination of the two.

The users 11a, 11b, 11c may be individuals, pawn shop personnel, law enforcement, or any other suitable users. The users 11a, 11b, 11c may preferably use the internet as the connection medium, with the user interface being a website. Alternatively, the users may have software running locally on their individual computers, or may have software running on a dedicated server for the registration system.

The database 12 may be implemented on software running on one or more servers, with one or more storage devices that house the registration entries. The software/search engine may handle queries, searches and submissions from the users, may look up entries in the database 12 based on particular query criteria, and may provide search results back to the users.

The two-way arrows in FIG. 1 show that information may flow in both directions, from the user to the database, and from the database to the user. In the exemplary system of FIG. 1, user 11c has sent a query to the database 12 about an item reported missing from the location of Nanuet, N.Y., and the database 12 has responded with information about three items having identical codes to that of the missing item. It will be understood that this scenario is merely exemplary, and that other types of queries and responses are possible.

The information sent by the user 11c may be referred to as an "entry" 13, which may include a code 14, an optional location 15, and an optional status (not shown). The code 14 is described in detail below. The location 15 may include a town, a state, a zip code, a text string indicating such, and/or any other suitable designation that indicates a geographical location. The optional status may include designations of "missing", "stolen", "lost", "found", "recovered", or any other suitable status. Optionally, the status may have a date attached with it, such as "lost on May 9, 2008". Queries to the database 12 may optionally reference this date, such as "items stolen in the past 30 days", "items reported in the past 60 days near Rochester, N.Y.", or any other suitable query.

The entry 13 is transmitted from the user 11c to the central database 12. The database 12 processes the entry 13 and/or suitable query, and if any entries in the database 12 satisfy the search criteria, returns those entries to the user 11c. In this example, the database 12 includes three entries 16a, 16b, 16c that satisfy the search criteria, which is that the entries 16a, 16b, 16c include codes 17a, 17b, 17c, respectively, that match the code 14 of the submitted entry 13.

The returned entries 16a, 16b, 16c also include locations 18a, 18b, 18c, respectively, and status indicators 19a, 19b, 19c, respectively. The locations 18a, 18b, 18c may be in the same format as location 15, although a different format may be used. Optionally, the database and/or its software may convert locations from one format to another for convenience. The status indicators 19a, 19b, 19c may use the same format as that described above.

Optionally, because the database may use an internet-based setting, the returned entries may have clickable links embedded in the report. For instance, if a particular jewelry item has been reported stolen within a certain period of time, such as within the last 30 days, then the report to the user may include a clickable link that, when clicked, brings up additional information about the stolen item, such as one or more pictures and/or more detailed information or text. The additional information may be supplied by the (rightful) owner of the jewelry, during registration and/or afterwards. Alternatively graphic features such as the mouse pointer opening a balloon containing details from the dialog box for that particular entry as the pointer "snaps" from one number or symbol to the next can provide for immediate operator matching or elimination of a suspect item being compared to the database.

In an alternative embodiment, it may be necessary for access to the photos be restricted to law enforcement or other neutral party lest a thief or fraud artist simply claim ownership. A further software enhancement would be to require the recovering party (ie alleged owner) to submit all evidence of ownership into the data base (photo, sales receipt, insurance appraisal, etc) into the data base before gaining access to photos. This would give law enforcement a chance to compare evidence of ownership to the data on file before returning an item to its "rightful" owner.

Optionally, an entry that shows up as "stolen" or "stolen within a particular time window" may show up in a highlighted color, as italicized, as boldface, as having an accompanying picture, and/or as having a clickable link. The clickable link may also be displayed with the number of items hot linked by the subscriber. For instance if a subscriber had three items stolen, the link for each would be displayed as X,X,X, X,X,X,X,X (3). Clicking the "3" would reveal the other items. Prospective buyers running verification software would be provided information on all the items taken which could coincide with the merchandise they are being offered. The hot link can be shown with "ghost" information from the first two required dialog boxes (see FIG. 4).

Figure 2:
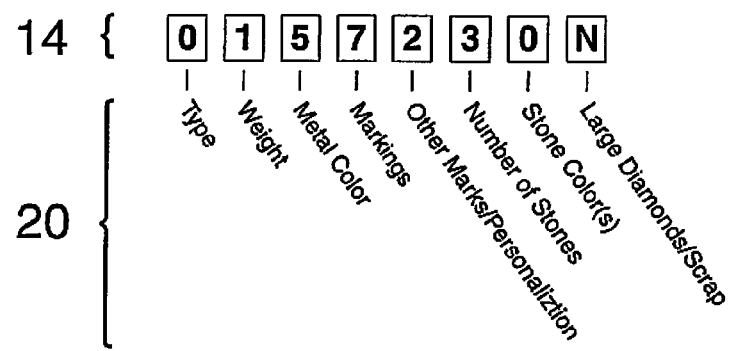
FIG. 2 is a schematic drawing of a code used in the jewelry registration, verification and recovery system of FIG. 1.

FIG. 2 is a schematic diagram of an exemplary code 14. The code 14 has a predetermined number of alphanumeric characters, which may be referred to as digits even though they may include numbers, letters and/or ASCII characters. Each digit is associated with a particular category 20, and each category 20 in the code 14 occupies one or more digits in the code 14. Note that because each digit may have only a set number of values (10 if confined to numerical values, another 26 for alphabetical characters, 256 for ASCII characters, hexadecimal or other character system which provides a large number of possibilities per digit space, the choices within each category 20 effectively become multiple-choice. For instance, there may be only 10 choices of color in the code, and users may be forced to pick "blue" rather than "chartreuse". "Other" categories exist in color selection the operator may enter the color. This limiting to a set of predefined choices is be beneficial, in that the limiting process may reduce the specific knowledge or skills required to determine a code, which is the primary problem of prior art identification systems. They require skills and judgments of experts who are not available to encode such a massive database of stolen or lost items. This invention resolves a long felt need (how non experts can assess a massive amount of goods without special skills and still produce an effective recovery system. Prior failed attempts have either required the engraving of serial numbers (fails for non compliance and impossibility in some cases), expert or computer assessment of goods which has failed for lack of trained assessors and lack of compliance. The present invention succeeds over the failure of other attempts in that it recognizes that the last majority of lost and stolen items will not be appraised or assessed and that they may not even be registered BEFORE loss. The present invention does not need preregistration to be highly effective. Instead it uses a series of forced criteria, which are relatively broad, but collectively provide significant narrowing of search engine matches. By further adding the time differential between recovery and registration as a factor in determining exactness of match needed, the system is highly accurate considering data is entered by a vast number of untrained users.

Furthermore, the registration system is based upon reliance upon simple physical parameters of a piece of jewelry that can be used to assign it to a narrowly defined code category (sometimes unique). Such assignment eliminates the reading of potentially hundreds of reports and acts as a screening method to enable targeting of either the lost item or one off very similar properties. This code makes it possible to rapidly enter data and/or search a database for highly similar articles. Once located, detailed narrative descriptions can be referenced for confirmation of identity.

Figure 3:
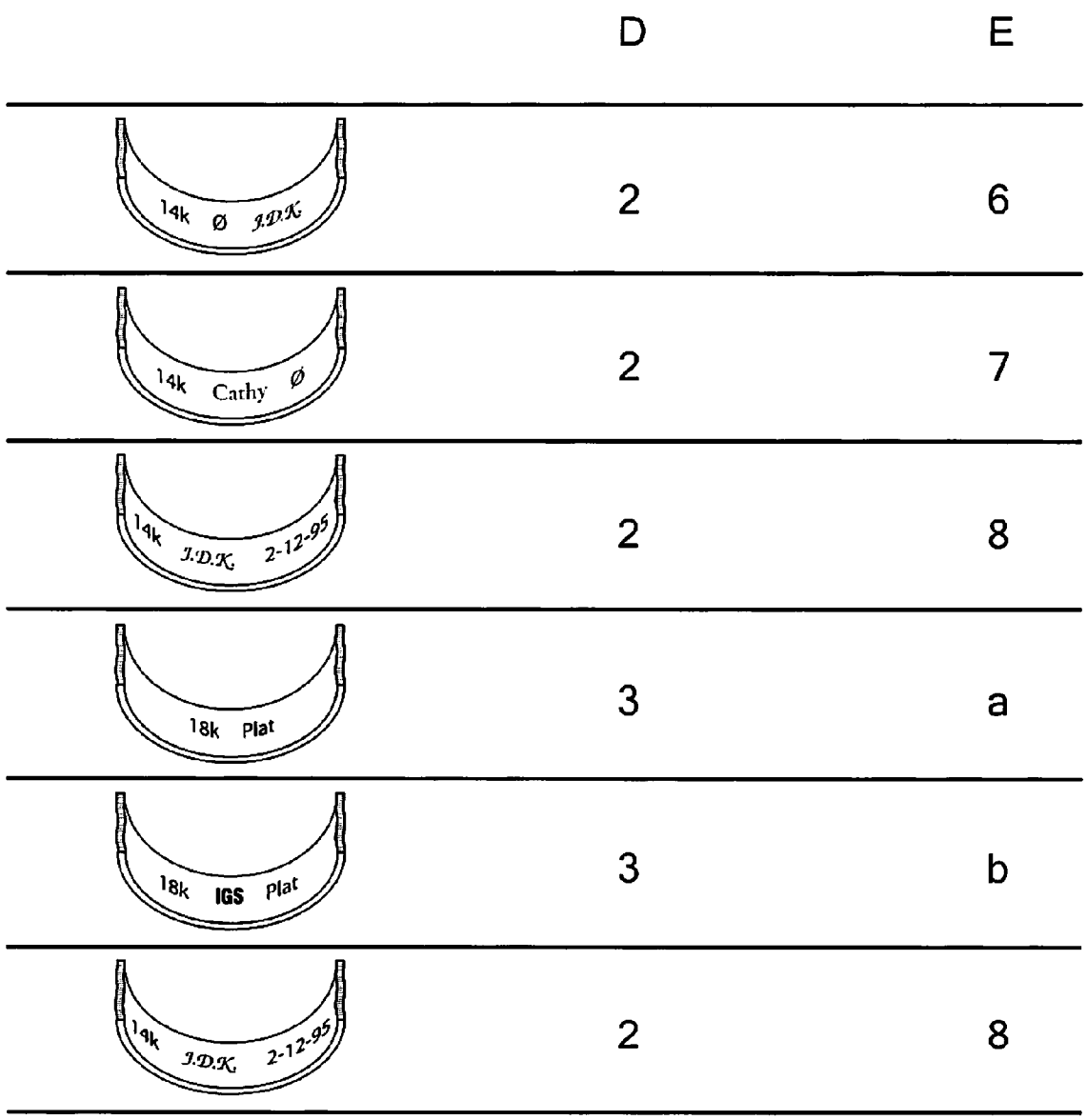
FIG. 3 is an example of how markings could be applied to the inside of a ring (portion broken away). The group of elements are different examples with categories D and E displayed according to their assignment of digital values.

The digits in the code are arranged so that the first digit corresponds to a particular code, which is the same particular code for all existing entries in the database and all new entries to the database. Likewise, the second digit corresponds to another particular code, being the same for all database entries, and so forth for all digits in the code. In the exemplary code of FIGS. 1 and 2, the first two digits in every code correspond to the type of jewelry, the next two digits correspond to the weight of the jewelry item, then next digit corresponds to the color of the metal, and so forth. These categories and their order in the code are merely exemplary, and should not be construed as limiting in any way; any suitable categories and category orders may be used in the code. Several of these exemplary categories are described below and are shown in the graphic in FIG. 3.

A first exemplary category is type of jewelry, or, equivalently, description. This may be a ring, a pair of earrings, a watch, a necklace, a bracelet, and so forth. Each of these descriptions may be assigned a corresponding value that goes in the assigned digit in the code. In the example of FIGS. 1 and 2, two digits are used to determine the type of jewelry. If only numerical values are used for these digits, that allows for 100 different types of jewelry that may be used with the particular exemplary code.

A second exemplary category is weight. The weight may be specified in grams, pennyweight, ounces, pounds and ounces, or any other convenient unit of weight or mass, and may be rounded off to specifically fit within the number of digits in the code. Weight is an advantageous category, because accurate scales are readily available, because the weight of a particular piece of jewelry is not something that is conventionally measured or reported, and because the weight of a particular item is not something that is particularly easily altered by a would-be thief.

A third exemplary category is color of metal. Gold is, naturally, gold colored. Platinum and silver are silver (white)-colored, and so forth.

A fourth exemplary category is fineness markings.

A fifth exemplary category is "other markings" and personalization. This may include custom engravings with names, numbers or other indicia. This may also include dates and mint marks for coins.

A sixth exemplary category is the number of stones. In some applications, one digit is allocated for the number of stones, which may include values of 0 through c. A value of c in the code may mean that there are 12 or more stones in the jewelry piece.

A seventh exemplary category is the color of the gemstone (s) in the piece.

An eighth exemplary category is the shape of the principal stone or information about gemstone pairs. This category include diamonds, which may allow the operator to code descriptive parameters of diamonds of a half carat or larger. Other suitable categories may be used as well. Likewise, the categories may appear in any order in the code, provided that the same ordering is used for all codes in the database.

In some embodiments, the value in one category (digit) of the code may determine which categories are used in subsequent digits of the code (ie some codes may be cascaded or force only limited choices in a subsequent code). For example, if the category (or digit) corresponding to "description" contains a value corresponding to "ring", then other digits in the code may have categories specific to rings, such as "size", "engravings," "stone," "bevel," "color," and so forth. Each of these categories may have a corresponding digit in the code, where the value of one specific digit in the code corresponds to "ring". If the code digit corresponding to "description" contains a value corresponding to "watch", then the other digits in the code may have predefined corresponding categories that describe watches. In this manner, each code may have the same number of digits, but the attributes for each digit may depend on the value of one or more digits. Alternatively, the codes may have varying numbers of digits, but the attributes for each digit may depend on the value of one or more digits. Some categories will contain clickable code selections that open a dialog box so unique identifiers such as serial numbers and other unique markings may be entered.

While it is preferable to have fixed length codes with relatively broad criteria per digit, it is possible that in each digit field, there can be a subcode option. There are many ways to accomplish this, but the core purpose of not overcomplicating the system can be maintained if the evaluator must still select the broad criterion even if he/she want to also specify more specifically. For example, if the stone color field requires a choice of blue or green, and the stone is blue-green, the evaluator must elect either blue or green in that digit space, but, by electing to have subfields, he/she may also be able to specify blue-green as a subchoice. Thus the broad category forced election is maintained by the database has subdata which may be revealed to a search on hits or the search engine may allow, but not required sub field searching. Subfield data can be signified in the code by an extra digit preferable following a decimal point or other separator, which tells the search engine or user that subfield data has been optionally supplied. This extra digit(s) and/or separator can also be used to tell the data base that the code is of a certain version or style in case the style or version changes over the years. This prevents the code system to become obsolete if new criteria or technologies are created. In other words, the code will be backward compatible.

Alternatively, the code may be replaced with a file, with tags denoting the category and values within the tags. In some applications, the file may use the XML format. For instance, in the XML format, an item with a weight of 27 may include the line, "<weight>27</weight>". For these tagged files, the categories may appear in any order, and may vary from entry-to-entry. The database may use software that allows for queries on one or more categories.

Initially, the database needs to be constructed. In this initial phase, it is desirable to register as many jewelry codes as possible, for as many users, retailers, buyers, and venues as possible. In some applications, software to enable an operator to assign the code may be available to appraisers at a nominal cost and clients may be able to register their items after establishing an account on the database. In some applications, codes may then be submitted and added to the database at a small fee, which may cover holding the listing for a period of time, such as 3-5 years. In some applications, renewal notices will go out at 3-5 year intervals. In this manner, the database generates revenue, which pays for its operation.

Once the database has been partially or fully populated, the database may be used to check if a particular piece of jewelry has been reported stolen or missing. It is envisioned that this feature may be used by pawn shops to deter would-be thieves, since a stolen item would appear quickly in the database as being stolen, and would alert tip off the pawn shop personnel.

In this second phase, in which the database has been fully or partially populated, the software may be upgraded to permit searching the data base as well as assigning codes. It is at this point that buyers may be able to verify jewelry they are considering purchasing. In this phase, as well as the initial phase, initiatives to law enforcement for integration of the database into the NCIC and similar systems made.

The following paragraph describes the situation for verification, in which a pawn shop owner enters the code of a particular item into the database, and receives several flagged entries from the database, all having an identical code or a suitably close code.

In the case of coded items with unique identifiers, such as serial numbers, the recovery is immediate. In other cases, the detailed appraisal or photograph and/or victim may be consulted/interviewed for positive identification. Codes without specific identifiers, not being totally unique, can occur on items other than the target item. Such "false hits" may be eliminated with follow-up information. The obvious benefit to anyone investigating a loss or theft is that eliminating a false hit or two may be easier than the currently impossible task of interviewing or reviewing the purchases of hundreds of buyers as documented by written descriptions. A sample example and database report follows below.

In this example, a client from Morton Grove, Ill. has her three-sapphire ring coded and many months later it is stolen. A pawn shop in Chicago is presented a three sapphire ring, makes a quick code assignment and checks the national database. There are 8 items similarly coded in the database. One listing is in Illinois and displayed in bold red type meaning it was reported stolen within 30 days. Lost or stolen items more than 30 days reported go to red italic type style showing they are reported missing but the report is more than 30 days old. New and old reported lost or stolen codes become links. While the code is highlighted immediately, database space is made available to the original owner to upload a photograph or detailed description to the link. In general, it is beneficial for wise pawn shop or other buying entity to establish positive identification of the person offering jewelry for pawn or sale, such as a driver's license, a thumb print, and so forth, being consistent with the requirements of the local jurisdiction of the pawn shop.

Finally, we describe one specific example for the coding. This specific example is not intended to be limiting in any way.

In this example, the code itself has 8 positions that can be occupied by numerical digits. The 8 positions are labeled herein as "A" through "H". Each position corresponds to a category, described, below, and can accommodate a numerical value of "0" through "9".

The first position, "A", has a category of "identity", with values of "0" through "9" corresponding to ring, bracelet, necklace, pendant, earring, brooch, wrist watch, pocket watch, loose coin, and other, respectively. The values corresponding to wrist watch, pocket watch and other may allow for extra information entered by the user in an additional dialog box or using the extension digit mentioned above, the extra information is in addition to the 8-digit code and is not contained in the code.

The second position, "B", has a category of "weight in grams", with values of "0" through "9" corresponding to 0.1-2.5, 2.6-4.0, 4.1-6.0, 6.1-8.0, 8.1-11.0, 11.1-14.0, 14.1-17.0, 17.1-24.0, 24.1-30.0, and 30+ exact. The value corresponding to 30+ exact may allow for extra information entered by the user in an additional dialog box. This extra information is in addition to the 8-digit code and is not contained in the code.

The third position, "C", has a category of "metal color", with values of "0" through "7" corresponding to no metal, white, yellow, rose, green, two-tone, three-color and multiple. Values of 8 and 9 are not used in this category.

The fourth position, "D", has a category of "fineness markings", with values of "0" through "9" corresponding to none, 9k, 10k, 14k, 18k, platinum, sterling, 585, 750 and other. The value corresponding to other may allow for extra information entered by the user in an additional dialog box. This extra information is in addition to the 8-digit code and is not contained in the code.

The fifth position, "E", has a category of "other marks/personalized", with values of "0" through "9" corresponding to none/unclear, trademark, engraving, trademark and engraving, initials, name, date, name and date, initials and date, and other. The values corresponding to all but none/unclear and trademark may allow for extra information entered by the user in an additional dialog box. This extra information is in addition to the 8-digit code and is not contained in the code. Similar to the extension digit mentioned above, this information could also be contained in an extension field, but digit E, if it contains any value, indicates that there is some additional indicia and the exact nature of the indicia will be found in a linked data file.

The sixth position, "F", has a category of "number of stones with values of "0" through "9" corresponding to none, 1, 2, 3, 4, 5, 6, 7, 8, and 9 or more.

The seventh position, "G", has a category of "stone color", with values of "0" through "9" corresponding to no stones, clear white, white, red, blue, black, yellow, green, pearl, and mixed/other. The value corresponding to mixed/other may allow for extra information entered by the user in an additional dialog box. This extra information is in addition to the 8-digit code and is not contained in the code.

The eighth position, "H", has a category of "diamonds and scrap metal", with a value of "0" corresponding to not applicable, and a value of "9" allowing for extra information entered by the user in an additional dialog box. This extra information is in addition to the 8-digit code and is not contained in the code.

A preferred example of a sample code appears below:

| Code | A<br>Identity | B<br>Weight (g) | C<br>Metal<br>Color | D<br>Fineness<br>Markings | E<br>Other Marks<br>Personalized | F<br>Number<br>of<br>Stones | G<br>Stone<br>Color | H<br>Center<br>Stone<br>Shape/Pairs |
|---|---|---|---|---|---|---|---|---|
| 0 | Ring | 0.1-0.8 | No Met. | None | None | None | No Stones | Not Applicable |
| 1 | Bracelet | 0.9-1.9 | White | 10k | Date | 1 | White | Round |
| 2 | Necklace | 2.0-2.6 | Yellow | 14k | Initials | 2 | Red | Sq. or Rect |
| 3 | Pendant | 2.7-3.2 | Rose | 18k | Name | 3 | Red/White | Oval |
| 4 | Earring | 3.3-4.3 | Green | Plat. | Trademark | 4 | Blue | Pear |
| 5 | Brooch | 4.4-5.5 | 2-Tone | Pall | Date & TM | 5 | Blue/White | Marquise |
| 6 | Wristwatch | 5.6-7.5 | 3-Color | Ster | Initials & TM | 6 | Green | Triangle |
| 7 | Poc.Wat Watch | 7.5-9.0<br>9.6-15.5 | Other | 585 | Name & TM | 7 | Green/White | Pear Shape |
| 8 | Loose Coin Coin | 9.1-12.0 | | 750 | Class Rings & Other Pers. | 8 | Pearl | Earring Pairs |
| 9 | Other | 12.1-17.0 Exact | | Other | 2nd fineness mark only | 9 | Pearl/White | Other |
| A | | 17.1-24.0 | | | 2nd fineness mark & TM | 10 | Opal | |
| B | | 24.1-32.0 | | | Other | 11 | Opal/White | |
| C | | 32.1+ | | | | 12+ | Other | |

Dealing with generic items presents special problems. Generic items are those which are so common that sheer quantity will overwhelm the searcher. An examples could be a man's plain wedding band. The search engine software will recognize items because they reach/exceed a predetermined count frequency in the database and for that assigned code. The software will recognize such replicating items and notify the user at the point of data entry with something like: "WARNING, item is too common to rely solely on the 8 digit code. We suggest engraving the item with additional indicia like initials. The jewelry store will also benefit from enhanced revenue with additional engraving fees.

The above specific example for the coding is merely exemplary, and should not be construed as limiting in any way.

While this present system is designed to minimize subjectivity in assigning codes to each items of jewelry or other valuables, but there is always some level of subjectivity which cannot be eliminated. In order to increase then likelihood of recovery, the relative timing of the loss/theft and registration or re-registration can be an additional indicator in addition to the other codes. If this system is in widespread use, then a purchaser of lost or stolen goods will re-register the item (not realizing that it has ever been in the data base). The original owner would have reported it stolen or lost and a time/date code would be assigned to the date of loss entry. The preferred method of search, would therefore be to attempt a match of recent reports of loss with recent registrations. In the preferred embodiment, the matching software would allow for a greater level of code-mismatch if the time span between report of lost and (re-) registration is shorter. The longer the time span, the more stringent the code match would become. This methodology would increase the chance of recovery without overwhelming the inquirer with too many "loose" matches. As time passes, the quantity of loose matches would increase and reach a point at which the "noise" level would make the search impractical. This would also encourage buyer to register immediately (perhaps required by law) and consequently thieves would be discouraged from trying to fence items which are likely to be detected in the data base.

The description of the invention and its applications as set forth herein is illustrative and is not intended to limit the scope of the invention. Variations and modifications of the embodiments disclosed herein are possible, and practical alternatives to and equivalents of the various elements of the embodiments would be understood to those of ordinary skill in the art upon study of this patent document. These and other variations and modifications of the embodiments disclosed herein may be made without departing from the scope and spirit of the invention.

I claim:

1. A loss recover control management system for recovery of a pieces of jewelry without marking the jewelry in any way, including a computer having a processor and memory, an input and output device, comprising:
   a. creating a data table comprising a plurality of physical characteristics of the piece of jewelry, the plurality including at least a description, a weight and a color; each characteristic being assigned a particular one digit code, said one digit code corresponding to a digit in a concatenated multi-digit code comprising a plurality of characteristics and their parameters for each digit of the code;
   b. inputting data collected from examination of said jewelry, assigning said concatenated multi-digit code to the piece of jewelry, and storing the concatenated multi-digit code assigned to the jewelry into a database on a computer, the code having a plurality of digital positions with a one-to-one correspondence with the plurality of physical characteristics as available from retrieval of the data table;
   c. inputting a digitized image of the jewelry into the data base and linking said digitized image with said concatenated multi-digit code;
   d. storing the concatenated multi-digit code linked to said digitized image into said database on said computer; and
   e. storing owner information into said computer and linking said concatenated multi-digit code to owner information;
   f. assessing a recovered piece of jewelry against the data table and assigning it a recovered concatenated multi-digit code based on its characteristics;
   g. searching said recovered concatenated multi-digit code in said data base;

h. comparing near matching stored concatenated multi-digit codes with said recovered concatenated multi-digit code and displaying associated digitized image of said stored codes to the digitized image of the recovered jewelry, so that a determination can be made if the recovered jewelry matches jewelry in the data base without marking the jewelry with any concatenated multi-digit codes.

2. The system of claim 1, wherein each position comprises a predetermined number of alphanumeric digits.

3. The system of claim 1, wherein each position comprises a single alphanumeric digit.

4. The system of claim 1, wherein one digit of the description comprises a type of jewelry.

5. The system of claim 1, wherein one digit of description comprises the color of the material.

6. The system of claim 1, wherein one digit of description comprises the color of at least one stone.

7. The system of claim 1, wherein one digit of description comprises the plurality of physical characteristics relating to a fineness.

8. The system of claim 1, wherein one digit of description comprises the existence of any personalization markings.

9. The method of claim 1, wherein one digit of description comprises a number of stones.

10. A loss recover control management system for recovery of a pieces of jewelry without marking the jewelry in any way, including a computer having a processor and memory, an input and output device, comprising:
 a. an input device prompting a user for a search code, the search code representing a plurality of physical characteristics of the piece of jewelry, each characteristic represented by a single digit;
 b. searching said search code against codes in a central database, the central database including a plurality of entries corresponding to previously reported pieces of jewelry, each entry comprising:
  i. a database code representing a plurality of physical characteristics, each of said characteristics represented by a single digit to form a concatenated string of digits representing multiple characteristics of the jewelry;
  ii. said code linked to a physical location of the jewelry corresponding to said code; and
  iii. said database storing whether the jewelry has been reported stolen or missing; and
  iv. transmitting to the user a subset of database entries, each entry in the subset having a database code loosely matched to the search code.

11. The system of claim 10, further comprising:
 a. prompting the user for a search location to limit the scope of the search;
 b. receiving the search location at the central database; and
 c. transmitting to the user a subset of database entries, each entry in the subset having a database code loosely identical to the search code and a database loosely near to the search location.

12. The system of claim 11, wherein the search code and the database codes include a plurality of standardized categories and a discrete value within each category.

13. The system of claim 12, wherein the plurality of categories comprises at least a description, a weight and a color.

14. The system of claim 12, wherein the plurality of categories further comprises one digit corresponding to at least one of:
 a. a fineness marking;
 b. a personalization;
 c. a number of stones;
 d. a stone color;
 e. a diamond; and
 f. a scrap metal.

15. The system according to claim 14, wherein the physical characteristics is color and categorizing color into groups corresponding to code numbers to minimize subjectivity in color descriptions.

16. The system according to claim 14 further including having a computer input of comparing all newly registered item of jewelry to a database of recent requests for verification so that potentially recently registered stolen jewelry can be more easily detected.

17. The system of claim 10, further comprising:
 a. transmitting to the user a subset of database entries;
 b. each entry in the subset having a database code identical to the search code; and
 c. a database location close to the search location, and a database status of stolen or missing.

18. The system of claim 17, wherein the database status of each entry in the subset has been recently updated as stolen or missing.

19. The system of claim 18, wherein the database status of each entry in the subset has been updated within the a predetermined date range as stolen or missing.

20. A loss recover control management system for recovery of a pieces of jewelry without marking the jewelry in any way, including a computer having a processor and memory, an input and output device, comprising, the server being configured for:
 a. receiving an entry corresponding to a piece of jewelry, each entry comprising:
 b. a location and date of receipt;
 c. a status indicating whether the piece of jewelry has been reported stolen or lost;
 d. a code, the code including a plurality of categories and at least one discrete value for each category, each category corresponding to a physical characteristic of the piece of jewelry;
 e. storing the received entry in a central database; and
 f. retrieving the entry in response to a query, the query having the a range of similar codes as the entry.

21. The system of claim 20, wherein the date of receipt of the report of lost or stolen are compared to the date of receipt of a report of recovery for each item matched in the data base, and wherein the range of codes which are considered potential matches is widened for reports and recoveries which are closer in time than those which are farther apart in time.

22. The system of claim 20, wherein the piece may be recovered before it is reported lost or stolen.

* * * * *